United States Patent [19]
Boos et al.

[11] Patent Number: 6,021,720
[45] Date of Patent: Feb. 8, 2000

[54] STAND FOR SUPPORTING AND SECURING ITEMS SUCH AS A PORTABLE COMPUTER

[76] Inventors: Shane M. Boos, 8000 W. 148th St., Overland Park, Kans. 66223; Eric H. Tse, 10931 Richards Ct., Lenexa, Kans. 66210

[21] Appl. No.: 08/944,915

[22] Filed: Oct. 6, 1997

Related U.S. Application Data

[63] Continuation of application No. 08/570,916, Dec. 12, 1995, Pat. No. 5,673,628.

[51] Int. Cl.[7] ............................................. A47B 5/00
[52] U.S. Cl. ..................... 108/44; 269/45; 248/919; 248/924; 248/316.1; 108/152
[58] Field of Search ................... 248/924, 923, 248/921, 919, 316.1, 316.4, 316.6, 292.12, 298.1; 211/8, 89.01; 269/159, 45, 65; 108/152, 44

[56] References Cited

U.S. PATENT DOCUMENTS

| | | |
|---|---|---|
| 2,669,958 | 2/1954 | Sweeney ................................. 269/45 |
| 2,679,684 | 6/1954 | Fagan ................................. 269/159 |
| 3,023,063 | 2/1962 | Hansen . |
| 3,391,960 | 7/1968 | Megargle et al. . |
| 3,592,144 | 7/1971 | Futrell . |
| 4,619,386 | 10/1986 | Richardson . |
| 4,672,898 | 6/1987 | Davidson . |
| 4,852,499 | 8/1989 | Ozols . |
| 4,909,159 | 3/1990 | Gonsoulin . |
| 4,913,412 | 4/1990 | Plouvier ................................. 269/65 |
| 5,177,665 | 1/1993 | Frank et al. . |
| 5,359,349 | 10/1994 | Jambor et al. . |
| 5,438,936 | 8/1995 | Wang . |

*Primary Examiner*—Peter M. Cuomo
*Assistant Examiner*—Gerald A. Anderson
*Attorney, Agent, or Firm*—Litman, Kraai & Brown L.L.C.

[57] ABSTRACT

A stand for supporting and securing an item such as a portable computer comprises a hinged leaf assembly with adjustably positionable clamping members. The clamping members are slidingly secured along outer edges of hingedly connected leaves of the leaf assembly to permit sliding advancement of the clamping members relative to and along the edges of the leaves to which they are attached. An articulated arm is secured at an upper end to the underside of the leaf assembly and at a lower end to the surface relative to which the item is to be supported such as the floor of a vehicle.

19 Claims, 3 Drawing Sheets

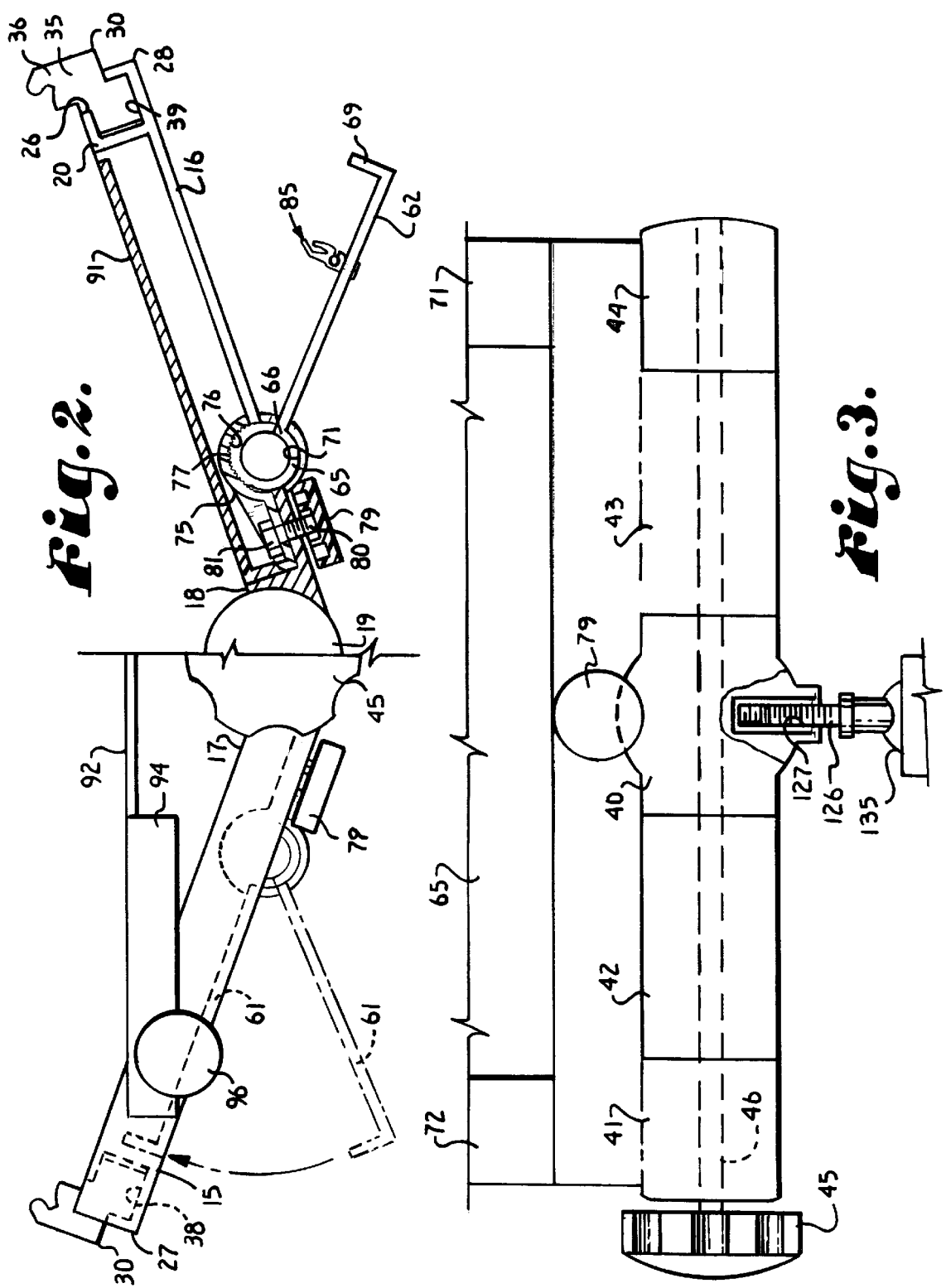

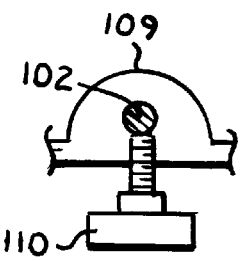
Fig. 4.
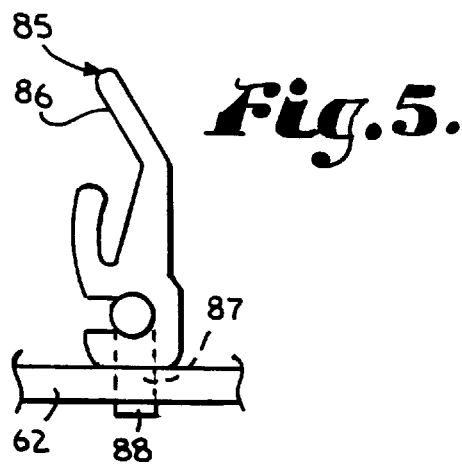
Fig. 5.
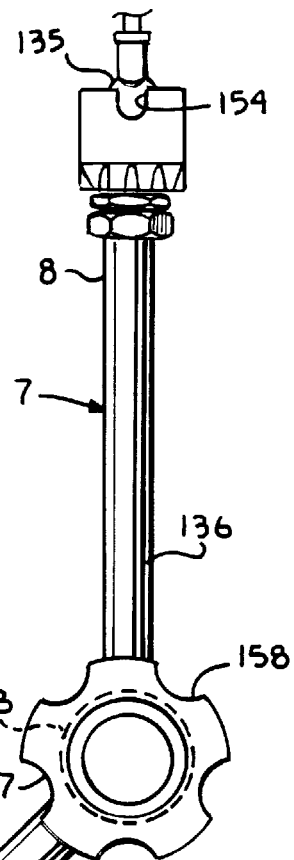
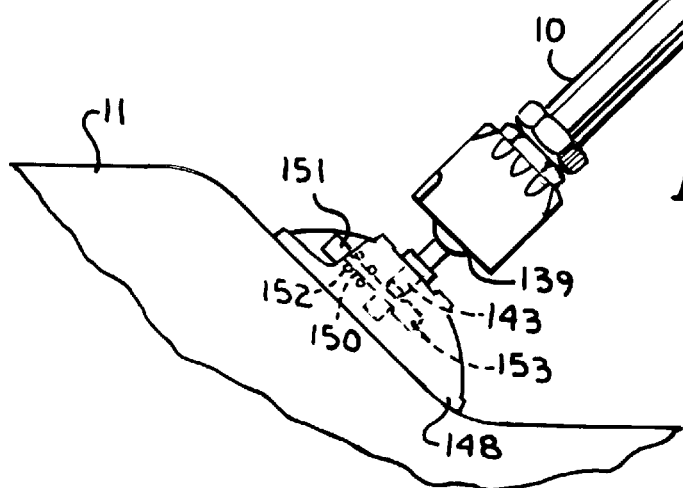
Fig. 6.

STAND FOR SUPPORTING AND SECURING ITEMS SUCH AS A PORTABLE COMPUTER

CROSS REFERENCE TO RELATED APPLICATIONS

This application is a continuation of application Ser. No. 08/570,916 entitled A TABLE FOR SUPPORTING AND SECURING A PORTABLE COMPUTER IN A VEHICLE, filed Dec. 12, 1995 and having an issue date of Oct. 7, 1997 as U.S. Pat. No. 5,673,628.

BACKGROUND OF THE INVENTION

The present invention relates to a stand for supporting and securing items such as a portable computer.

Continuing advancements and developments in portable computers and their accessories have resulted in increasing use of portable computers in a wide range of environments such as in vehicles or in situations where a relatively flat surface on which to place the computer is not available.

An increasing number of sales representatives, insurance adjusters, delivery truck drivers and other workers who spend a considerable portion of their work time in a vehicle, carry portable computers in their vehicles to facilitate the entry, retrieval and utilization of data before, during and after sales calls, deliveries or out of office meetings. Unfortunately, most vehicles are not designed to function as desks. The portable computer is usually placed in the passenger seat while the worker is in transit, and then placed in the worker's lap during use, hopefully after parking the vehicle. Many portable computers are damaged when the vehicle comes to a relatively quick stop and the momentum of the unrestrained portable computer causes it to crash into the dash of the car. In addition, trying to operate a portable computer in your lap while in the relatively cramped confines of an automobile can prove awkward and uncomfortable. A worker may also need to use the portable computer in the field at locations where neither a desk nor any other acceptable relatively flat surface is available for supporting the computer during use.

Although various table type structures, stands and the like have been developed for use in supporting items in a vehicle, most of these tables or stands do not provide means for securing items to the table at least without modifying the item itself or which would not impair the useability and accessibility to a portable computer secured thereon. U.S. Pat. No. 5,438,936 issued to Wang on Aug. 8, 1995, discloses a table with clamps for securing an item therebetween. However, the clamps, which expand and retract along a fixed axis, may tend to block or cover up various ports, slots, electrical connectors or related openings along the sides of the portable computer which permit use of various accessories. Such ports, slots, and connectors might comprise floppy drives, CD rom readers, PC card slots, power supply ports, mouse attachment ports, printer ports, ports for connecting full size screens and keyboards, ports for modem cards and the like. The location of these openings, ports or connectors varies from computer to computer and therefore the table is limited in the variety of computers with which it may be used without restriction. There continues to be a need for a stand which may be secured in a vehicle for supporting and securing almost any brand or style of personal computer thereon without impairing accessibility to the various ports, accessories or connectors for various accessories.

SUMMARY OF THE INVENTION

The present invention comprises a stand for supporting and securing a portable computer. The stand comprises a hinged leaf assembly to which a portable computer or the like may be supported. The leaf assembly is adapted to be secured to a support member such as an articulated arm. A lower end of the articulated arm is adapted to be secured to structure such as a base plate mounted to a vehicle or other structure relative to which the computer is to be supported.

The leaf assembly comprises a first leaf and a second leaf hingedly secured together at inner ends thereof. At least one and preferably two abutment members, are slidingly secured along outer ends of each of the first and second leaves. Opposed sets of the abutment members on the outer ends of the first and second leaves are adapted for engaging and supporting a portable computer or the like therebetween. The relative location of the abutment members along the outer edge of each leaf is adjustable to avoid obstructing access to a port or the like on the computer.

The stand further includes a pair of pivotal support trays, each pivotally secured to an outer surface of one of the leaves and pivotal away from the respective leaf to provide a tray for supporting accessories thereon. Side support trays are removably securable across adjacent ends of the leaves.

The articulated arm is designed to be manipulated through a wide range of motion to permit the leaf assembly and the item supported thereby to be placed or oriented as desired. Further the articulated arm includes means for locking the arm in place after an orientation is selected.

OBJECTS AND ADVANTAGES OF THE INVENTION

The objects and advantages of this invention include: providing a stand which may be used for supporting an item such as a laptop computer relative to a surface and which includes means for firmly securing an item thereto; providing such a stand particularly well adapted for securing a wide variety of portable computers thereon; providing such a stand wherein the securement mechanism does not interfere with accessibility to ports, openings or connectors on the sides of the computer or on the bottom thereof; providing such a stand comprising a hinged leaf assembly having a pair of leaves hingedly secured together for securing an item between outer ends of the leaves; providing such a stand which includes at least one abutment member slidingly secured to each leaf along an outer edge thereof; providing such a stand wherein the stand is selectively positionable in a wide range of positions and orientations within a vehicle; providing such a stand which is securable to an articulated arm which is removably secured to the vehicle; providing such a stand which is collapsible to a relatively low profile configuration; providing such a stand which is readily transportable by a person; providing such a stand wherein the articulated arm is readily removable from the vehicle; providing such a stand which is particularly well adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged and fragmentary right side view of the stand of the present invention with portions broken away to show interior detail.

FIG. 3 is an enlarged and fragmentary view showing a portion of the hinge of the leaf assembly.

FIG. 4 is an enlarged and fragmentary cross-sectional view taken generally along line 4—4 of FIG. 1.

FIG. 5 is an enlared and fragmentary cross-sectional view taken generally along line 5—5 of FIG. 1.

FIG. 6 is a fragmentary plan view of the articulated arm of the table of the present invention in an extended position and shown secured at a lower end to the floor of a vehicle.

DETAILED DESCRIPTION OF THE INVENTION

Figure 1:
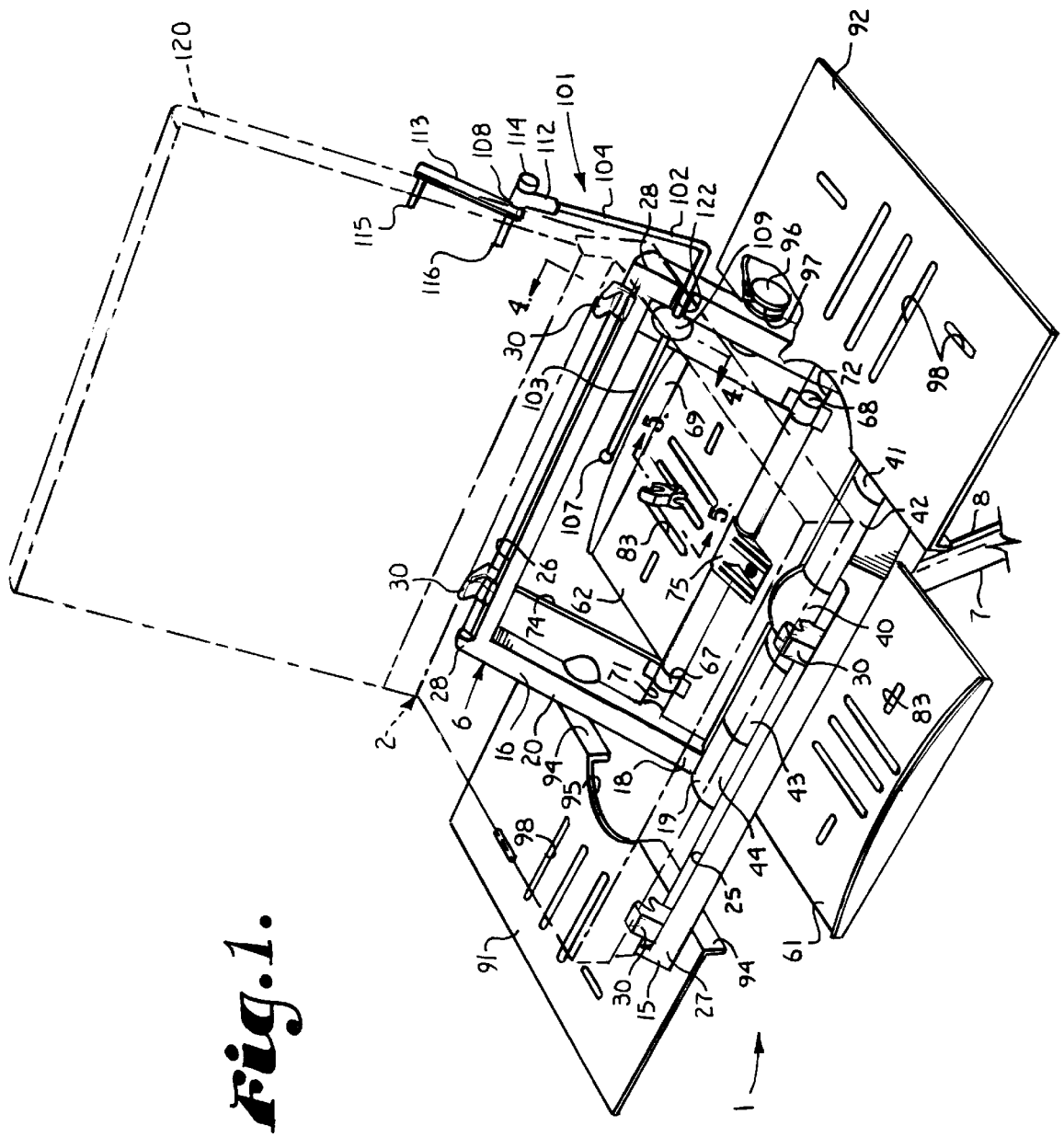
FIG. 1 is a fragmentary perspective view of a stand of the present invention comprising a leaf assembly and an articulated arm and having a portable computer shown in phantom lines secured thereon with the lid of the computer in an open position and with portions broken away to show detail.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The disclosure of U.S. Pat. No. 5,673,628 for A TABLE FOR SUPPORTING AND SECURING A PORTABLE COMPUTER IN A VEHICLE, filed Dec. 12, 1995 and having an issue date of Oct. 7, 1997 is incorporated by reference.

Referring to the drawings in more detail, the reference numeral 1 comprises a stand for supporting and securing a portable computer 2. The stand 1 comprises a leaf assembly 6 and an articulated arm 7 secured at an upper end 8 to the leaf assembly 6. A lower end 10 of the articulated arm 7 is secured to the floor 11 of a vehicle 12. For the purpose of this application, directional terms will relate to the stand as generally oriented in FIG. 1 which shows a portable computer in phantom lines secured to the stand 1.

The leaf assembly 6 comprises a first leaf 15 and a second leaf 16 secured together at inner ends 17 and 18 respectively thereof by hinge assembly 19. Each leaf 15 and 16 includes a circumferential rim 20 extending generally around the outer periphery of the respective leaf 15 and 16 on an inner face thereof so as to form an interior space within the circumferential rim 20.

Slots 25 and 26 are formed in the leaves 15 and 16 along outer ends 27 and 28 thereof on the circumferential rim 20. A pair of abutment members 30, are slidingly secured in each of the slots 25 and 26. The abutment members 30 are adapted for engaging and supporting a portable computer 2 or the like therebetween. Each abutment member 30 includes an inner portion 34, a neck 35 and an outer portion 36. The inner portion 34 extends into a channel 38 or 39 formed in the rim 20 in the respective leaf 15 and 16. The neck 35 extends through the respective slot 25 and 26 and the outer portion 36 extends exteriorally relative thereto. The inner portion 34 and the neck 35 of each abutment member 30 are sized to allow sliding advancement of the abutment member 34 relative to the respective slot 25 and 26 and channel 38 and 39. The relative location of the abutment members 30 along the outer edge 27 and 28 of each leaf 15 and 16 respectively is adjustable to avoid obstructing access to a port or the like on a computer to be supported therebetween.

The shape or materials of construction of the abutment members may be varied to obtain the desired characteristics for supporting a computer therebetween. For example an inner face of the outer portion 36 of each abutment member may be formed from a relatively soft rubber to enhance gripping of a computer thereby. The inner portion 34 of the abutment members is preferably formed from a relatively rigid material to facilitate sliding within the channels 38 and 39 and to provide rigidity for securely supporting a computer between opposed abutment members.

The first and second leaves 15 and 16 are pivotally advanceable between a closed alignment and an open alignment. In the closed alignment, the leaves 15 and 16 generally extend flush relative to each other and in a fully open alignment the leaves 15 and 16 extend almost 180 degrees apart. The stand 1 can be adjusted to support objects of different widths by adjusting the angle at which the leaves 15 and 16 are opened relative to one another and thereby adjusting the distance between opposed sets of abutment members 30 on respective outer edges 27 and 28 of the leaves 15 and 16.

The outer portions 36 of the abutment members 30 generally extend above the outer edges 27 and 28 of the leaves 15 and 16 when the leaves 15 and 16 are opened relative to one another in an upwardly angled orientation such that a computer 2 supported between the abutment members 30 is supported above the leaf assembly 6. The use of the leaf assembly 6 for supporting a computer 2 allows access to any ports or the like in the bottom of the computer 2 between the leaves 15 and 16.

The leaves 15 and 16 are pivotal between the open and closed alignment by hinge assembly 19 which includes center section 40, first, second, third and fourth pivoting sections 41, 42, 43 and 44 respectively, adjustment knob 45 and shaft 46. The first and third pivoting sections 41 and 43 are connected to the second leaf 16 and the second and fourth pivoting sections 42 and 44 are connected to the first leaf 15. The center section 40 is not connected to either leaf 15 or 16.

Various means can be used to fix the leaves 15 and 16 at the desired angle to accommodate the item to be supported. For example, a set of gears (not shown) could be incorporated into the hinge assembly 19 and connected to adjustment knob 45 by shaft 46 and configured to permit rotation of the leaves 15 and 16 relative to one another by rotation of knob 45 and then holding the leaves 15 and 16 at the selected orientation. It is also foreseen that a spring (not shown) could be incorporated into the hinge 19 to biasingly urge the leaves 15 and 16 toward the closed alignment such that the abutment members 30 are biasingly urged into engagement with an item supported therebetween. It is also foreseen that the hinge 19 could incorporate a set of adjustable stops (not shown) to prevent rotation of the leaves 15 and 16 past a selected angle. The stops would be adjustable to adjust the angle to which the leaves 15 and 16 are allowed to open.

A first set of support trays 61 and 62 are pivotally secured to leaves 15 and 16 respectively. A cylindrical spine 65 extends along an inner edge of each support tray 61 and 62 with the ends 67 and 68 of the spine 65 extending beyond the sides of the respective tray 61 and 62. An upturned lip is formed on the outer edge 70 of each support tray 61 and 62. The ends 67 and 68 of the cylindrical spine 65 are mounted in semi-circular grooves 71 and 72 on opposite sides of each leaf 15 and 16 and across an opening 74 in each leaf 15 and 16, the opening in each leaf 15 and 16 being sized to accommodate trays 61 and 62 respectively. A clamping member 75 having a semi-circular grooved first end 76 is mounted within each leaf 15 and 16 such that the semi-circular grooved first end 76 extends around a portion of the cylindrical spine 65 on a side opposite the grooves 71 and 72. Interlocking ridges 77 are formed on the outer surface of the spine 65 and in the semi-circular grooved first end 76 on the clamping member 75 where the two overlap to prevent rotation of the spine 65 relative to the clamping member 75 semi-circular groove 76 when the clamping member 75 is drawn against the spine 65. The clamping member 75 may be drawn toward the spine 65 by tightening of knob 79 having a threaded stem extending through a second end of the clamping member 75.

When the knob 79 and the clamping member 75 are loosened, the trays 61 and 62 may be pivoted between a closed alignment, wherein the trays 61 and 62 extend across the respective opening 74, and an open alignment wherein the trays are angled away from the respective leaf 15 and 16. The trays 61 and 62 are adapted to support accessory items such as car phones and the like thereon.

A plurality of slots 83 are formed in each tray 61 and 62. Locking pins 85 are slidingly secured within slots 83 and advanceable into engaging relationship with an item to be supported on the trays 61 and 62. An item to be supported on the tray, such as a cellular phone, is preferably positioned on the tray such that one edge of the item is positioned against the upturned lip 69 and one or more locking pins are then positioned in abutting relationship against an opposite edge of the item. The locking pins 85 may be locked in position to secure the item between the pins 85 and lip 69. The locking pins 85 include a cammed locking lever 86 pivotally mounted to an anchor pin 87 which is positioned within a slot 83 and which includes an anchor base 88 on an opposite side of the tray 61 or 62. When the lever 86 is pivoted flush relative to the tray 61 or 62, the lever 86 may be slid relative to the slot 83 in which it is secured. When the lever 86 is pivoted to an upright orientation relative to the tray 61 or 62, the anchor base 88 is pulled snugly against the tray 61 or 62 to prevent sliding of the lever 86 along the slot 83. The width of the anchor base 88 is narrower than the width of the slot 83 while its length is greater than the width of the slot 83 such that the lever 86 may be removed from securement in the slot 83 by rotation of the anchor base 88 relative to the slot 83. The lever 86 preferably includes a biasable surface to adapted to enhance the hold on an item by the lever 86.

A second pair of support trays or side support trays 91 and 92 are removably securable to the leaf assembly 6 on opposite ends thereof across adjacent ends of leaves 15 and 16. Each tray 91 and 92 includes a downwardly turned lip 94 extending across an inner edge 95 thereof. Slotted mounts 96 are secured on the ends of each leaf 15 and 16. A slot or groove 97 is formed around the periphery of the mount 96 and sized to receive a portion of the lip 94 such that the trays 91 and 92 may be supported by mounts 96 on the ends of the leaves 15 and 16 when advanced to an open alignment. The mounts may be rotatably mounted to the leaves 15 and 16 or the slot 97 may extend completely around the mount 96 to ensure proper alignment of the slots 97 with the lip 94 regardless of the degree to which the leaves 15 and 16 are opened.

The trays 91 and 92 are sized and shaped to fit within the interior space defined by the circumferential rim 20 of each leaf 15 and 16 for storage therein when not in use as generally shown in FIG. 2 with respect to tray 92. The trays 91 and 92 have a plurality of slots 98 formed therein to accommodate locking pins 85 for securing items or accessories on the trays 91 and 92 in a manner similar to that as described for trays 61 and 62.

A monitor support assembly 101 is secured to leaf 16 on the right side thereof as viewed in FIG. 1. The monitor support assembly 101 includes an L-shaped support rod 102 having first and second legs 103 and 104, support rod end cap 107, monitor support bracket 108, support rod mount 109, and a set screw 110. The rod 102 is pivotally and slidably mounted in a hole extending through the mount 109. The bracket 108 includes a lower section 112 which is rotatably mounted to a distal end of the rod 102 and may be rotated 360 degrees relative thereto. The bracket 108 further includes an upper section 113 which is rotatably connected to the lower section 112 along an axis extending perpendicular to the axis of rotation of the lower section 112. A tightening screw 114 may be tightened to resist rotation of the upper section 113 relative to the lower section 112. The upper section 113 includes upper and lower prongs 115 and 116 which are adapted for positioning adjacent opposite faces of a monitor/lid 120 of a laptop computer 2 for securing the monitor/lid 120 in an open position.

The first leg 103 of the support rod 102 is slidingly advanceable relative to channel 122 in the circumferential rim 20 of leaf 16. When the monitor support assembly 105 is not in use, the first leg 103 is slid as far as possible toward the opposite side of the leaf 16 such that the second leg 104 and the bracket 108 are positioned inside of the circumferential rim 20. The second leg 104 of the rod 102 is rotated downward relative to the orientation shown in FIG. 1 and the bracket 108 is folded back over the second leg 104 such that the monitor support assembly 101 may be secured within the leaf assembly 6 when advanced to a closed orientation. When the monitor support assembly 101 is to be used, the second leg 104 is pivoted upward into alignment with channel 122 and the support rod 102 is then slid to the right through the channel 122 to advance the second leg 104 out side of the rim 20. The second leg 104 of the support rod is rotated upward to the orientation shown in FIG. 1 and the bracket is then swiveled into position such that the prongs 115 and 116 extend on opposite sides of the monitor/lid 120. The set screw 110 and the tightening screw 114 are then tightened to secured the relative orientation of the monitor support assembly 101 to support the monitor/lid 120 in the desired orientation.

The articulated arm 7, as shown in FIG. 4 is of the type sold by Bogen Photo Corp. of Ramsey, N.J. under the trade names Variable Friction Magic Arm or Bogen Magic Arms. The arm 7 is adapted to be connected to the leaf assembly 6 by threaded stud 126 which is securable within threaded bore 127 in the center section 40 of the hinge assembly 19.

The threaded stud 126 is connected to a first ball and socket joint 135 which is connected to an upper arm 136. The upper arm 136 is connected to a lower arm 137 by rotational locking joint 138. A second ball and socket joint 139 is connected to the lower arm 137 at an end opposite the rotational locking joint 138. A coupling pin 143 is connected to and extends outward from the second ball and socket joint 139.

The coupling pin 143 is adapted to be removably securable to a base 148 which is in turn welded or bolted to the floor 11 of the vehicle 12. The coupling pin 143 is insertable into the base 148 and engageable by a spring loaded locking pin 150 to removably secure the arm 7 to the base 148. A first end 151 of the spring loaded locking pin 150 is exposed and may be pressed inward against the biasing force of spring 152 to advance an engaging end 153 of pin 150 out of engagement with a groove in coupling pin 143 to permit removal of the coupling pin 143 from the base. It is foreseen that other suitable connectors could be utilized in accordance with this invention as an alternative to the coupling shown.

The articulated arm 7 is designed to be manipulated through a wide range of motion to permit the leaf assembly 6 to be placed or oriented as desired within the vehicle 12. The first ball and socket joint 135 permits 360 degree rotation of the leaf assembly relative to the upper arm 136. Such rotation would permit a portable computer 2 secured on the leaf assembly 6 to be rotated from facing the driver's seat of the vehicle 12 to facing the passenger seat. The first ball and socket joint 135 also permits pivotability of the leaf assembly 6 relative to the upper arm 136 of up to 90 degrees by rotation of the first threaded coupling 128 into a slot 154 in joint 135. The second ball and socket joint 135 also permits 360 degree rotation and up to 90 degree pivotability of the lower arm 137 relative to the floor 11 of the vehicle 12 through similar means.

The rotational locking joint 138 permits 360 degree rotation of the upper arm 136 relative to the lower arm 137 which facilitates raising or lowering the relative position of the leaf assembly 6 within the vehicle 12. The upper arm 136 and the lower arm 137 may be pivoted in and out of side-by-side alignment. The cooperation of all three joints 135, 138 and 139 would permit the entire arm 7 to be collapsible down to the floor 11 in a relatively low profile so that the table 1 may be placed out of the way when not in use. The remainder of the stand 1 can also be removed from the arm 7 and likewise folded to facilitate carrying or for storage outside the vehicle 12. A locking assembly 157 is provided and includes a locking knob 158. Tightening of the locking knob 158, locks all three joints, 135, 138 and 139 firmly into position after the arm 7 has been set in the desired alignment.

It is foreseen that the upper and lower arms 136 and 137 of the articulated arm 7 could be constructed to be telescoping. In addition, spacers or extenders might be provided which could be secured to the arm 7 at either end to increase the overall length of the arm 7. Further the means for connecting the arm 7 to the vehicle 12 and to the leaf assembly 6 could comprise a wide range of means including clamping structure which would permit the arm 7 to be quickly coupled to existing structure in the vehicle 12 or in other settings without the need for modifying the vehicle 12, through mounting of a base 148, to permit use of the table 1.

Clips, not shown, may be used with the stand 1 for securing various cords or electrical connectors (not shown) to the stand 1 and out of the way. It is also foreseen that the clips could be integrally formed into the leaf assembly 6 and the articulated arm 7.

It is to be understood that while certain forms of the present invention have been illustrated and described herein, it is not to be limited to the specific forms or arrangement of parts described and shown.

What is claimed and desired to be secured by Letters Patent is as follows:

1. A stand for supporting and securing a portable computing device thereto; said stand comprising:

a. a leaf assembly including a first leaf and a second leaf pivotally and directly secured together at inner ends thereof by a common hinge assembly and pivotal about a single hinge axis between a closed position wherein said first and second leaves extend in abutting relationship and an open position wherein said first and second leaves are angled apart;

b. a first abutment means secured to said first leaf proximate an outer end thereof for engaging said portable computing device along a first edge thereof;

c. a second abutment means secured to said second leaf proximate an outer end thereof for engaging said portable computing device along a second edge thereof; and d. a support member securable at one end to said leaf assembly and having an opposite end adapted for supporting said stand relative to a surface.

2. The stand as in claim 1 wherein:

a. said support member comprises an articulated arm removably securable to a base.

3. The stand as in claim 1 wherein:

a. at least one of said first and second abutment members is selectively positionable at multiple positions laterally relative to said outer ends of said first and second leaves respectively.

4. The stand as in claim 1 wherein:

a. said first abutment member is slidingly secured to said outer end of said first leaf and slidable along said first leaf outer end; and b. said second abutment member is slidingly secured to said outer end of said second leaf and slidable along said second leaf outer end.

5. The stand as in claim 1 further comprising:

a. a first pivotal support tray pivotally secured along an inner edge thereof to said first leaf.

6. The stand as in claim 5 further comprising:

a. a second pivotal support tray pivotally secured along an inner edge thereof to said second leaf.

7. The stand as in claim 1 further including:

a. a first side support tray removably securable to first and second mounts secured on first adjacent ends of said first and second leaves.

8. The stand as in claim 7 further comprising:

a. a second side support tray removably securable to third and fourth mounts secured on second adjacent ends of said first and second leaves.

9. A stand for supporting and securing an item thereto; said stand comprising:

a. a leaf assembly including a first leaf and a second leaf hingedly secured together at inner ends thereof and having slots formed along outer ends thereof;

b. a first pair of abutment members slidingly secured within said slot in said outer end of said first leaf;

c. a second pair of abutment members slidingly secured within said slot in said outer end of said second leaf; and d. a support member securable at one end to said leaf assembly and having an opposite end adapted for supporting said stand relative to said structure.

10. The stand as in claim 9 wherein:

a. said support member comprises an articulated arm removably securable to a base mounted to the floor of a vehicle.

11. The stand as in claim 9 further comprising:

a. a first pivotal support tray pivotally secured along an edge thereof to said first leaf.

12. The stand as in claim 11 further comprising:
   a. a second pivotal support tray pivotally secured along an edge thereof to said second leaf.

13. The stand as in claim 9 further including:
   a. a first side support tray removably securable to first and second mounts secured on first adjacent ends of said first and second leaves.

14. The stand as in claim 13 further comprising:
   a. a second side support tray removably securable to third and fourth mounts secured on second adjacent ends of said first and second leaves.

15. The stand as in claim 14 wherein:
   a. said first leaf includes an interior space formed therewithin sized for storing said first side support tray therewithin; and
   b. said second leaf includes an interior space formed therewithin sized for storing said second side support tray therewithin.

16. A stand for supporting and securing an item thereto; said stand comprising:
   a. a leaf assembly including a first leaf and a second leaf hingedly secured together at inner ends thereof;
   b. a first abutment member secured to said first leaf proximate an outer end thereof;
   c. a second abutment member secured to said second leaf proximate an outer end thereof;
   d. a support member securable at one end to said leaf assembly and having an opposite end adapted for supporting said stand relative to a surface; and
   e. a first pivotal support tray pivotally secured along an inner edge thereof to said first leaf.

17. The stand as in claim 16 further comprising:
   a. a second pivotal support tray pivotally secured along an inner edge thereof to said second leaf.

18. A stand for supporting and securing an item thereto; said stand comprising:
   a. a leaf assembly including a first leaf and a second leaf hingedly secured together at inner ends thereof;
   b. a first abutment member secured to said first leaf proximate an outer end thereof;
   c. a second abutment member secured to said second leaf proximate an outer end thereof;
   d. a support member securable at one end to said leaf assembly and having an opposite end adapted for supporting said stand relative to a surface; and
   e. a first side support tray removably securable to first and second mounts secured on first adjacent ends of said first and second leaves.

19. The stand as in claim 18 further comprising:
   A. a second side support tray removably securable to third and fourth mounts secured on second adjacent ends of said first and second leaves.

* * * * *